(12) United States Patent
Willenegger et al.

(10) Patent No.: US 7,602,750 B2
(45) Date of Patent: *Oct. 13, 2009

(54) METHOD FOR POWER CONTROL FOR MIXED VOICE AND DATA TRANSMISSION

(75) Inventors: Serge Willenegger, Onnens (CH); Stein Lundby, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 736 days.

This patent is subject to a terminal disclaimer.

(21) Appl. No.: 11/241,288

(22) Filed: Sep. 30, 2005

(65) Prior Publication Data

US 2006/0029026 A1 Feb. 9, 2006

Related U.S. Application Data

(63) Continuation of application No. 09/771,138, filed on Jan. 24, 2001, now Pat. No. 7,130,288.

(51) Int. Cl.
*H04B 7/216* (2006.01)
(52) U.S. Cl. ...................... 370/335; 370/342
(58) Field of Classification Search .......... 370/335, 370/342
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,809,017 A | 9/1998 | Smith et al. | |
| 6,304,593 B1 | 10/2001 | Alouni et al. | |
| 6,426,960 B2 | 7/2002 | Antonio | |
| 6,574,211 B2 | 6/2003 | Padovani | |

FOREIGN PATENT DOCUMENTS

| | | |
|---|---|---|
| EP | 0765043 | 3/1997 |
| EP | 0878928 | 11/1998 |
| EP | 0893889 | 1/1999 |
| GB | 2238449 | 5/1991 |

OTHER PUBLICATIONS

International Search Report—International Search Authority—European Patent Office PCT/US02/01800 Jun. 6, 2002.

*Primary Examiner*—Steven Nguyen
(74) *Attorney, Agent, or Firm*—Howard H. Seo; Eric Ho

(57) ABSTRACT

In a disclosed embodiment, a "voice noise power" is added to an aggregate voice power which is the total voice power used by all users in a cell. The voice noise power is transmitted in addition to the aggregate voice power in order to maintain the total of the aggregate voice power and voice noise power at a pre-determined voice power limit. In one embodiment, the voice power limit can be increased or decreased to further improve control over power consumption during voice and data transmission. Further, in order to maintain the power consumed by data transmission at a desired level, data noise is transmitted after transmission of a data burst, or in between data bursts, by inserting a pre-determined amount of artificial data into the gaps in data transmission. The data noise is transmitted in addition to the data bursts in order to maintain the total power consumed during data transmission at a desired level.

44 Claims, 5 Drawing Sheets

METHOD FOR POWER CONTROL FOR MIXED VOICE AND DATA TRANSMISSION

CLAIM OF PRIORITY UNDER 35 U.S.C. §120

The present Application for Patent is a Continuation of patent application Ser. No. 09/771,138 entitled "Method for Power Control for Mixed Voice and Data Transmission" filed Jan. 24, 2001, now U.S. Pat. No. 7,130,288, and assigned to the assignee hereof and hereby expressly incorporated by reference herein.

BACKGROUND

1. Field

The present invention generally relates to the field of wireless communication systems. More specifically, the invention relates to downlink, i.e. from the base station to a set of terminal units, mixed voice and data transmission for code division multiple access communication systems.

2. Background

In a code division multiple access ("CDMA") communication system, such as IS-95, or CDMA2000, or WCDMA (wideband CDMA), transmission can be provided for voice communication and data communication simultaneously by transmitting voice and data signals across one or more communication channels. Certain types of signal transmission, for example, voice and certain types of low data rate data transmissions are degraded by delays in transmission. Certain types of data signal transmission, on the other hand, are tolerant of delays in transmission. For example, because the data is tolerant of delay, the data can be grouped into packets and scheduled for transmission. Furthermore, a delayed packet need not be dropped, and transmission errors can be corrected by simply retransmitting a packet at a later time, i.e. rescheduling the packet. Large amounts of packet data information can be transmitted efficiently in short "bursts" of data at high power and high data rate. Conventional voice/data transmission treats voice and data communications similarly by setting up a communication link at a pre-determined data rate, and attempting to transmit voice and data information without exceeding a certain frame error rate. With conventional low data rate voice/data transmission, changes in the data rate generally do not involve significant changes in the overall transmit power; this is because low data rate connections only use a fraction of the total power available at the base station. By way of contrast, transmission of high speed packet data may require frequent extreme changes in data rate which typically involve large changes in power level. Since high data rate transmission uses a significant fraction of the total base station transmit power, the overall base station transmit power level could be significantly affected by the variation in the power used for high data rate transmissions.

In the present application, voice signal transmission and other signal transmission which is degraded by delays in transmission, as well as conventional data transmission where changes in the data rate are infrequent and relatively minor and changes in transmission power levels are small relative to the total base station transmit power, are referred to as "voice". Data signal transmission, such as high speed packet data, which can be tolerant of delays in transmission and can be scheduled, and typically is transmitted in short "bursts" at high power and high data rate, as well as any signal transmission where changes in the data rate are frequent and extreme and changes in transmission power levels are relatively large, are referred to as "data".

In order to efficiently accommodate these different types of signal transmission simultaneously, i.e., mixed voice and data transmission, different approaches may be followed. One approach is to specify a different part of the frequency spectrum, i.e. a different "band" of frequencies or frequency band, for each type of signal. Another approach is to multiplex the voice and data signals together through time division. With the time division approach, some of the time available for transmitting the signals is allotted to voice signals and some of the time available for transmitting the signals is allotted to data signals. For example, in a GSM+GPRS system (Global System for Mobile combined with Generalized Packet Radio System) some time slots normally used for regular GSM voice transmission are instead used for packet data transmission. One approach, used as an example in the present application, is code division multiple access (CDMA), which allows multiple signals to be transmitted at the same time on the same frequency band.

In CDMA systems each user's signal is separated from other users' signals by modulating the transmission signal with a distinct spreading code sequence. The modulation of the transmission signal spreads its spectrum so that the bandwidth of the encoded transmission signal is much greater than the original bandwidth of the user's information. For this reason CDMA is also referred to as "spread spectrum" modulation or coding. Each user uniquely encodes its information into a transmission signal using the spreading code sequence. The intended receiver, knowing the spreading code sequence of the user, can decode the transmission signal to recover the information.

By way of background, in CDMA communications, the user's signal is spread to allow many users to simultaneously use the same bandwidth without significantly interfering with one another. One means of spreading is the application of distinct "orthogonal" spreading codes or functions, such as Walsh functions, to each user's signal. "Orthogonality" refers to lack of correlation between the spreading functions. In a given spread spectrum communication system using Walsh functions (also called Walsh code sequences), a pre-defined Walsh function matrix having n rows of n chips each is established in advance to define the different Walsh functions to be used to distinguish different user's signals. As an example, for a given sector (or cell in the WCDMA terminology), each downlink channel is assigned a distinct Walsh function. In other words, communications between a base station and each user are coded by a distinct Walsh code sequence in order to separate each user from the others.

The base station transmits signals to all users in a sector so that the Walsh codes are time synchronized in order to achieve orthogonality between the different signals. Effectiveness of the orthogonal spreading codes is affected by the phenomenon of "multipath". Simply stated, multipath is interference caused by reception of the same signal over multiple paths, that is, multiple copies of the signal arrive after different path delays. Due to the loss of time synchronization, the orthogonality between different user signals is lost. Interference due to loss of orthogonality through multipath can be averaged by the use of other types of spreading codes such as pseudo-noise ("PN") sequences, for example. The autocorrelation properties of PN sequences can be used to improve rejection of multipath interference. However, due to the loss of orthogonality through multipath, there is greater interference between the signals of different users, referred to as "intracell interference", including interference of a user's own signal with itself, also referred to as "self-interference".

In a multi cell system, there can be interference caused by user signals transmitted by the base station in one cell interfering with the user signals transmitted in another cell, also referred to as "inter-cell interference". The transmit power of the base station transmitters is controlled so as to minimize the amount of power transmitted into neighboring cells in order to limit inter-cell interference. Extreme fluctuations in transmit power can exacerbate the effects of inter-cell interference, as well as intra-cell interference between users including self-interference, described above.

FIG. 1 illustrates an example of the effect of data transmission on power control for multiple voice and data users within the same cell in a CDMA or spread spectrum communication system. FIG. 1 shows graph 100, having power axis 101 plotted against time axis 102. The transmit power for a typical voice user varies in time according to single user voice power curve 104. The aggregate transmission power for all the voice users within the cell is shown as Pv 106 in graph 100. Aggregate voice power Pv 106 varies in time as shown in graph 100. Power is allocated in addition to aggregate voice power Pv 106 for data burst transmissions 108, 109, and 110. The maximum available signal transmission power that can be allocated for the total of aggregate voice and data signal transmissions is maximum power limit Pmax 112, shown in graph 100 as a horizontal solid line and also indicated by "Pmax." The data and voice aggregate transmission power is shown as Pv+d 114 in graph 100. Data and voice aggregate power Pv+d 114 within the cell varies in time as shown in graph 100. As seen in graph 100, Pv+d 114 remains below maximum power limit Pmax 112.

FIG. 1 shows an example of the effect that data signal transmission can have on power control for a single user in terms of changes to single user voice power curve 104. As a result of data burst transmission 108, interference can be increased, due to the intra-cell effects outlined above, for the single user whose power allocation is represented by single user voice power curve 104. To balance the increased interference, power allocation can be increased for the single user leading to local power peak 105 in single user voice power curve 104. In a conventional voice/data transmission system, changes in power allocation between users tend to balance out, by occurring randomly in time, leaving only a minor effect on aggregate voice power Pv 106. However, the effect of data burst transmission 108 is simultaneous for many users in the cell, so there is a relatively large effect on aggregate voice power Pv 106, shown as increase 116 in aggregate voice power Pv 106.

Continuing with FIG. 1, at the end of data burst transmission 108, interference is reduced for the users within the cell. Thus, the power control system at the base station will decrease the power allocation to the users, leading to decrease 117 in aggregate voice power Pv 106. In a mixed voice and data communication system, the power control system must be able to respond quickly to changes in interference. Thus, decrease 117 in aggregate voice power Pv 106 may be more than needed in view of subsequent data burst transmission 109. In other words, the reaction of the base station's power control system leading to decrease 117 "undershoots" the equilibrium value for stable system performance. As a result, then, of data burst transmission 109, which again causes an increase in interference for the users, the base station's power control system increases the power allocation for the users, leading to increase 118 in aggregate voice power Pv 106. Once again, increase 118 in aggregate voice power Pv 106 may be more than needed. In other words, the reaction of the power control system leading to increase 118 "overshoots" the equilibrium value for stable system performance.

Thus, as shown in FIG. 1, when data signal transmission is mixed with voice signal transmission in a wireless communication system, the different signal characteristics of voice and data transmissions lead to problems with power control for users within the same cell. The signal characteristics of data communications, namely that data transmission typically occurs in bursts, tends to cause disruptions in power control which do not occur with the relatively continuous signal characteristics of voice communications. For example, over-allocation and under-allocation of power to each user and to the aggregate of all users within a cell can disrupt communications and severely degrade the quality of the communication links. In addition, the system becomes subject to large swings in the total power output, as shown by the large variations in the level of data and voice aggregate power Pv+d 114, which indicates the total power output of the system.

FIG. 2A, FIG. 2B, and FIG. 2C illustrate an example of some of the effects of data transmission on power control for users in neighboring cells in a CDMA or spread spectrum communication system. FIG. 2A shows a diagram of cells for exemplary cellular spread spectrum communication system 200 comprising several cells including cell 203, labeled "cell #0" and cell 206, labeled "cell #1." Despite the use of power control within each cell, out-of-cell terminal units cause interference which is not under the control of the receiving base station within the cell. Thus, for example, power control within cell 203 can be affected by interference from the transmission to terminal units in cell 206 and vice versa.

For example, in a mixed voice and data communication system, transmission of data within cell 203 can cause interference in a neighboring cell such as cell 206. The interference in cell 206 causes increased power allocation to terminal units in cell 206, which is in turn seen as increased interference in cell 203. The increased interference in cell 203 can cause increased power allocation in cell 203, which originally transmitted the data burst. Thus, there is a complete cycle of interaction between the power allocation in cell 203 and cell 206, which resembles a positive feedback loop. The cycle of interaction between the power allocation in cell 203 and cell 206 can lead to higher power consumption than necessary in both cells. The increased power consumption in cell 203 and cell 206 can be seen as increased interference by other neighboring cells, so that the positive feedback effect spreads power control problems from cell 203 and cell 206 to other cells in the system.

An example of feedback effect between two cells only, cell 203 and cell 206, is shown in detail in FIG. 2B and FIG. 2C. FIG. 2B shows graph 230, having power axis 231 plotted against time axis 232. The total transmit power for voice users within cell 203 is shown as aggregate voice power Pv 236 in graph 230. Aggregate voice power Pv 236 varies in time as shown in graph 230. Power for data burst transmission 237 is allocated in addition to aggregate voice power Pv 236. Maximum power limit Pmax 234 that is allocated for the total of aggregate voice and data transmissions in cell 203 is indicated in graph 230 by horizontal solid line Pmax 234.

FIG. 2C shows graph 260, having power axis 261 plotted against time axis 262. Time axis 262 of graph 260 is aligned vertically with time axis 232 of graph 230 so that points on time axis 262 in graph 260 align vertically below the simultaneous points on time axis 232 in graph 230. The total transmit power for voice users within cell 206 is shown as aggregate voice power Pv 266 in graph 260. Aggregate voice power Pv 266 varies in time as shown in graph 260. Maximum power limit Pmax 264 that is allocated for the total of aggregate voice and data transmissions in cell 206 is indicated in graph 260 by horizontal solid line Pmax 264.

Continuing with FIG. 2B and FIG. 2C, graph 230 of FIG. 2B shows that the total transmit power within cell 203 is represented by aggregate voice power curve Pv 236, up until transmission of data burst 237. During data burst 237, the total transmit power within cell 203 is substantially equal to Pmax 234. After data burst 237, the total transmit power within cell 203 is again represented by aggregate voice power curve Pv 236. Similarly, graph 260 of FIG. 2C shows that the total transmit power within cell 206 is represented by aggregate voice power curve Pv 266. As discussed above, the power increase in cell 203, from Pv 236 to approximately Pmax 234, during data burst 237 is seen as increased interference by the users within cell 206. The increased interference in cell 206 leads to higher power allocation by the power control system in cell 206. The higher power allocation is reflected in increase 267 in aggregate voice power curve Pv 266. Conversely, increase 267 in aggregate voice power in cell 206 is seen as increased interference by the users within cell 203 and leads to higher power allocation by the power control system in cell 203. The higher power allocation by the power control system in cell 203 is reflected in increase 238 in aggregate voice power curve Pv 236.

The feedback process continues back and forth between cell 203 and 206 and can lead to a cell allocating the maximum transmit power available, as shown, for example, by maximum 268 in aggregate voice power curve Pv 266. When all available transmit power has been allocated, such as at maximum 268 shown in graph 230 of FIG. 2C, additional users can be denied access to the communication system. To the extent that additional users would have been able to access the communication system, system performance has been degraded. Further the communication link quality for the current users may also be degraded. As pointed out above, the effect can spread from cell to cell and is not restricted to the first pair of cells. Thus, FIG. 2A, FIG. 2B, and FIG. 2C illustrate an example of some of the effects between cells of data transmission on power control in a CDMA or spread spectrum communication system.

As noted above, mixed transmission of voice and data in a CDMA or spread spectrum communication system can subject the system to large swings or variations in the amount of transmission power consumed. For example, such large variation is shown in FIG. 1 by aggregate power curve Pv+d 114. As shown in FIG. 1, Pv+d 114 varies from approximately one half of limit of maximum power Pmax 112 to substantially all of Pmax 112. Such large variation, comprising 50% of the maximum power, would be typical for mixed voice and data communication systems where half of the available power is allocated for voice transmission and half of the available power is allocated for data transmission. As seen in FIG. 1 and in FIG. 2A, FIG. 2B, and FIG. 2C, the large variation can lead to over-allocation and under-allocation of power to each user and to the aggregate of all users within one cell or several cells in the communication system. The resulting instability of power control in the communication system can cause serious degradation of system performance including access problems and degradation of communication link quality for the users.

Thus, there is a need in the art for transmitting mixed voice and data signals without causing abrupt large variations in power consumption. There is also a need in the art for transmitting mixed voice and data signals without causing sudden large reactions in power control. Further, there is need in the art for transmitting mixed voice and data signals without causing undue interference within a cell. Moreover, there is a need in the art for transmitting mixed voice and data signals without causing undue interference between cells.

SUMMARY

The present invention is directed to a method for power control for mixed voice and data transmission. According to various embodiments of the invention, mixed voice and data signals are transmitted without causing abrupt large variations in power consumption or sudden large reactions in power control. Further, mixed voice and data signals are transmitted without causing undue interference within a cell or between cells.

In one aspect of the invention, a "voice noise power" is added to an aggregate voice power which is the total voice power used by all users in a cell. The voice noise power is transmitted in addition to the aggregate voice power in order to maintain the total of the aggregate voice power and voice noise power at a pre-determined voice power limit. Since the aggregate voice power and the voice noise power are substantially maintained at a relatively steady level, i.e. at the voice power limit, power fluctuations within a cell and also in the neighboring cells are significantly diminished. The voice noise power can be, for example, artificial voice noise which is orthogonally coded or PN coded. In one embodiment, the voice power limit can be increased or decreased to further improve control over power consumption during voice and data transmission.

Further, in order to maintain the power consumed by data transmission at a desired level, data noise is transmitted after transmission of a data burst, or in between data bursts, by inserting a pre-determined amount of artificial data into the gaps in data transmission. The data noise is transmitted in addition to the data bursts in order to maintain the total power consumed during data transmission at a desired level. For example, the data noise can be transmitted as artificial noise or dummy data, which is orthogonally coded or PN coded. Since the total power consumed during data transmission is substantially maintained at a desired level, power fluctuations within a cell and also in the neighboring cells are significantly diminished. In one embodiment, the desired level for data transmission power consumption can be increased or decreased to further improve control over power consumption during voice and data transmission.

DETAILED DESCRIPTION

The presently disclosed embodiments are directed to a method for power control for mixed voice and data transmission. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 3:
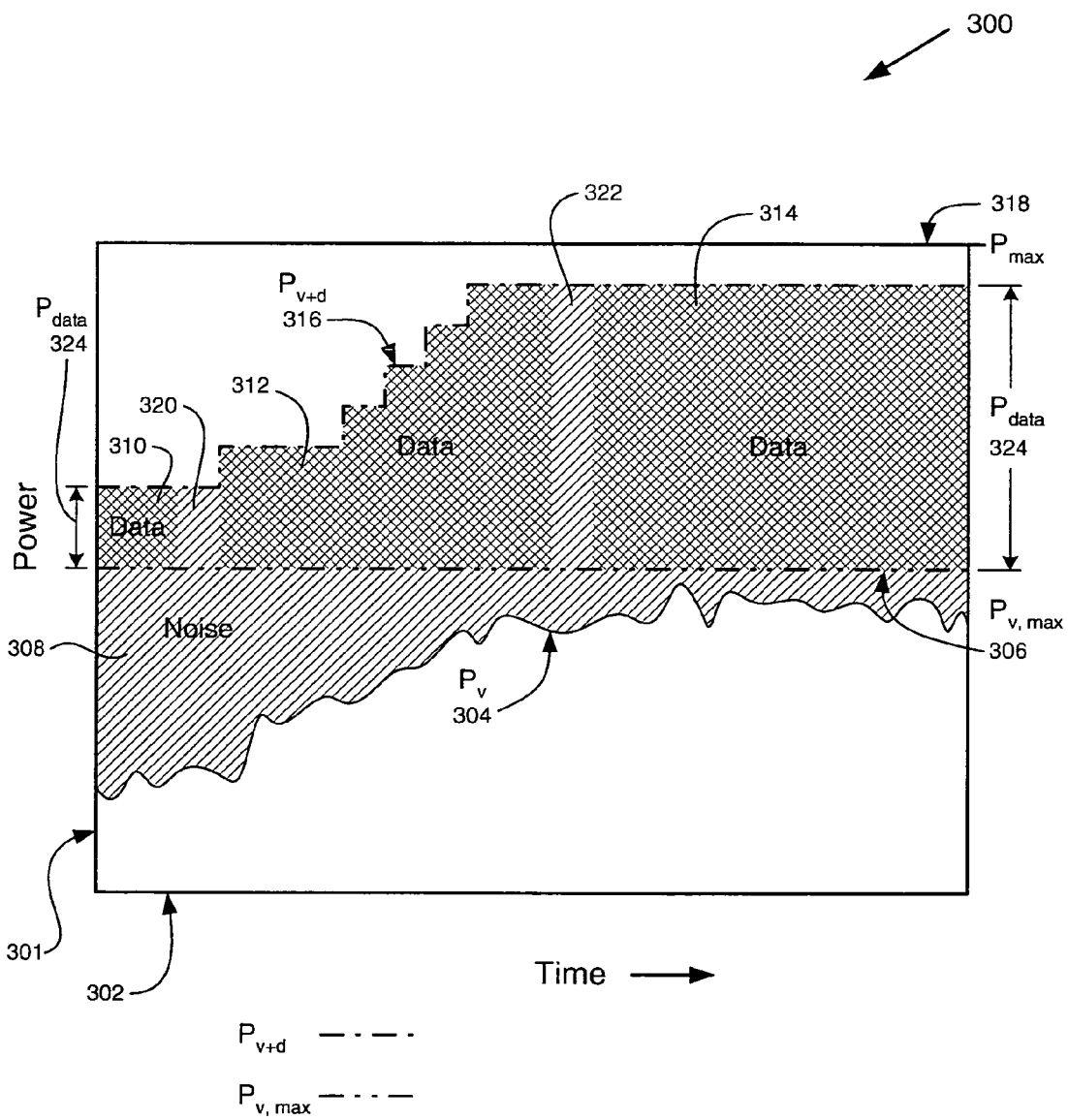
FIG. 3 illustrates an example of power control graphed as a function of time in accordance with one embodiment for a spread spectrum communication system.

FIG. 3 illustrates an example of power control in a CDMA communication system in accordance with one embodiment. The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention may utilize time multiplexing of data and various principles related to "high data rate" communication systems, and the present invention can be used in a "high data rate" communication systems, disclosed in U.S. patent application entitled "Method and Apparatus for High Rate Packet Data Transmission" Ser. No. 08/963,386 filed on Nov. 3, 1997, and assigned to the assignee of the present invention. The disclosure in that patent application is also hereby fully incorporated by reference into the present application.

Referring back to FIG. 3, graph 300 shows power axis 301 plotted against time axis 302. Aggregate voice power Pv 304 for all the voice users within the cell is shown in graph 300 as solid curve 304. Aggregate voice power Pv 304 varies in time as shown in graph 300. Voice power limit Pv,max 306 is the maximum voice power allocated for the aggregate of voice signal transmissions. Voice power limit Pv, max 306 is shown in graph 300 as horizontal double-dotted-dashed line 306. Extra voice power is allocated in addition to aggregate voice power Pv 304, so that the total voice power transmitted at any time is substantially equal to voice power limit Pv, max 306. The extra voice power, which "fills in" the gap between Pv 304 and Pv, max 306, can be provided, for example, by transmitting some additional information which is encoded using orthogonal codes just as if the additional power were being provided for additional users. In the embodiment shown in FIG. 3, no useful information is transmitted, so the extra voice power is transmitted as artificial noise. It is manifest that useful information can be transmitted using the extra voice power, the details of which are apparent to a person of ordinary skill in the art, and thus are not described here. The artificial noise is shown in FIG. 3 as voice noise power 308, and also indicated with the word "noise." Voice noise power 308 is encoded using, for example, orthogonal codes as if voice noise power 308 originated as an ordinary user signal. Thus, other users within the cell can still recover their own signal using spread spectrum despreading techniques such as orthogonal codes despite added voice noise power 308. In other words, the users within the cell are "protected" from voice noise power 308 by the use of orthogonal codes or PN codes or other means of spreading voice noise power 308.

Continuing with FIG. 3, power is allocated in addition to voice power limit Pv,max 306 for transmission of data bursts 310, 312, and 314. Total power Pv+d 316 is the total of aggregate voice power Pv 304 plus the power allocated for voice noise power 308 plus the power allocated for transmission of data bursts 310, 312, and 314. Thus, total power Pv+d 316 may also be stated as the total of Pv, max 306 plus the power allocated for data burst transmissions. Data power Pdata 324 is the power used for transmission of data bursts 310, 312, and 314. Thus, by definition:

$$Pv+d = Pdata + Pv, max.$$

Total power Pv+d 316 is shown in graph 300 as dotted-dashed, stepped line 316. Total power Pv+d 316 varies in time as shown in graph 300. The maximum available signal transmission power that can be allocated for the total of aggregate voice, artificial noise, and data transmissions is maximum total power limit Pmax 318, shown in graph 300 as horizontal solid line 318 and also indicated by "Pmax". As seen in graph 300, Pv+d 316 remains below maximum power limit Pmax 318.

As discussed above, transmission of data signals typically occurs in bursts, in contrast to transmission of voice signals, where the average power level for a number of users is relatively even. Thus, relatively large amounts of data are transmitted in bursts at high bit rates separated by periods of relative inactivity, or quiet, in which the data bit rate is low or data transmission ceases entirely. For example, after data burst 310 and before data burst 312, and again after data burst 312 and before data burst 314, there is no data available for transmission, i.e. there are gaps in the data transmission. In order to prevent total power Pv+d 316 from suddenly dropping, additional data power is transmitted when there are gaps in data transmission to maintain the power consumed by data transmission, data power Pdata 324, at a desired level. Accordingly, total power Pv+d 316 is maintained at a desired level.

The additional data power, which "fills in" the gap between data burst 310 and data burst 312, and the gap between data burst 312 and data burst 314, can be provided, for example, by transmitting some additional information which is encoded using orthogonal codes just as if the additional power were being provided for additional data users. In the embodiment shown in FIG. 3, no useful data is transmitted, so the additional data power is transmitted as artificial noise or dummy data. The artificial noise is shown in FIG. 3 as data noise 320, and data noise 322. Data noise 320 and data noise 322 are encoded, for example, using orthogonal codes as if data noise 320 and data noise 322 originated as ordinary data signals. Thus, users within the cell can still demodulate their own signals without undue interference from data noise 320 and data noise 322. In other words, the users within the cell are "protected" from data noise 320 and data noise 322 by the use of orthogonal codes or PN codes or other means of spreading data noise 320 and data noise 322.

FIG. 3 shows an example interaction of mixed voice and data signal transmission with power control in accordance with one embodiment. The amount of data power, Pdata 324, allocated to data burst 310 is controlled as a percentage of voice power limit Pv, max 306 rather than allocating the full amount of power which might be required to transmit data burst 310 as quickly as possible. For initial data burst 310, Pdata 324 is limited, for example, to 10% of Pv, max 306. Then, for example, for subsequent data burst 312, Pdata 324 is increased or adjusted upward by pre-determined amounts of 5% of Pv, max 306 as required to transmit the data at a reasonable rate. For example, Pdata 324 can be increased subject to specific conditions relating to the amount of data noise and actual data that have recently been transmitted. For example, the condition can be that the actual data transmitted, i.e. the amount of data transmitted in data burst 310, is 95% or more of the total power transmitted and that the data noise transmitted is 5% or less of the total power transmitted. Conversely, Pdata 324 can be decreased or adjusted downward by pre-determined amounts, for example, when the actual data transmitted is 50% or less of the total power transmitted and the data noise transmitted is 50% or more of the total power transmitted. In general, the pre-determined and pre-defined amounts for the adjustments can be any amounts between 0% and approximately 15%; 5% and 10% are used only as examples for illustrative purposes. For subsequent data burst 314, no further adjustments of Pdata 324 are required. As seen in the equation Pv+d=Pdata+Pv, max, total power Pv+d 316 is limited by the pre-determined increases in Pdata 324.

Figure 1:
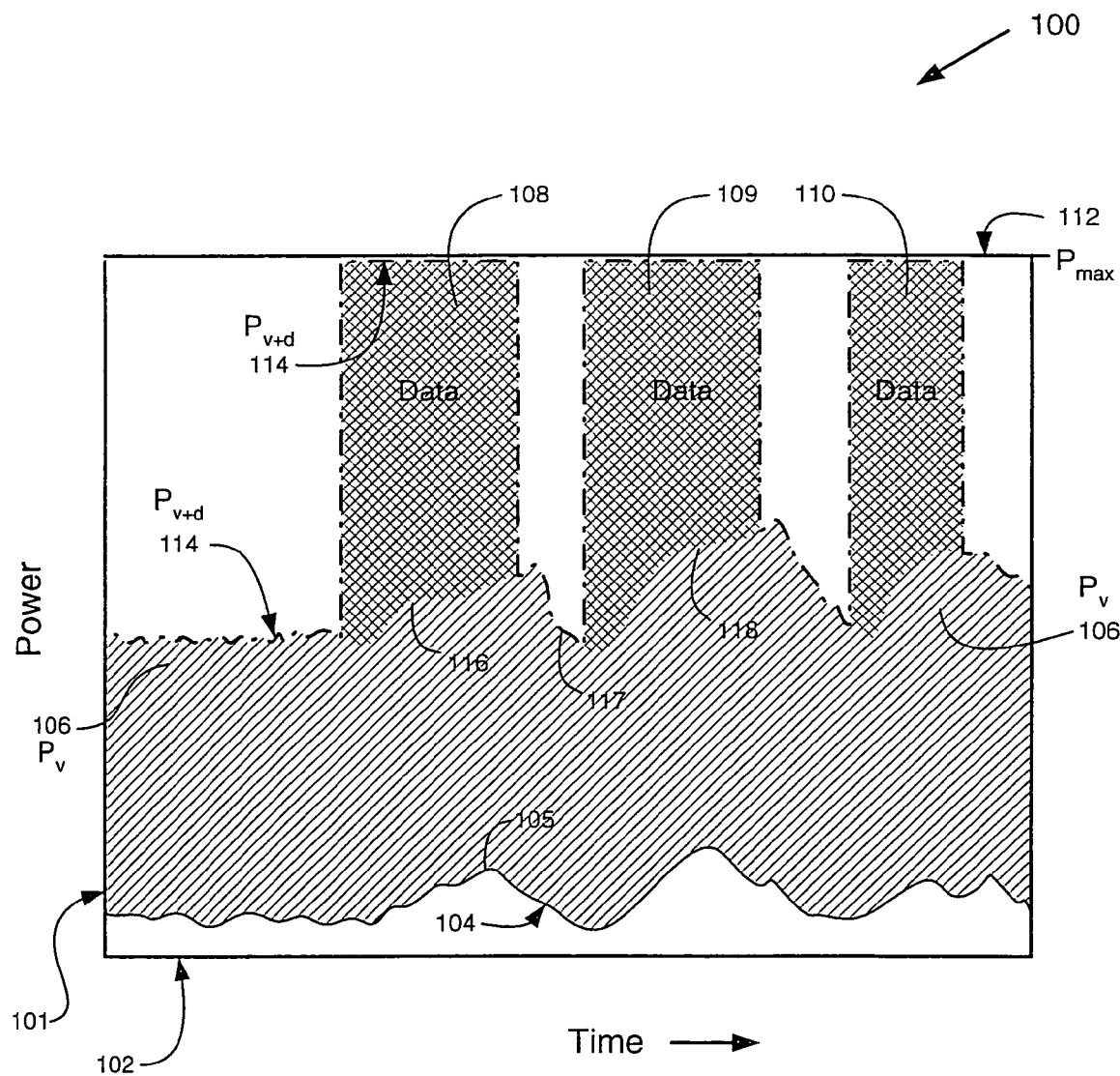
FIG. 1 illustrates an example of power control for mixed voice and data transmission within one cell in a spread spectrum communication system.
Figure 2A:
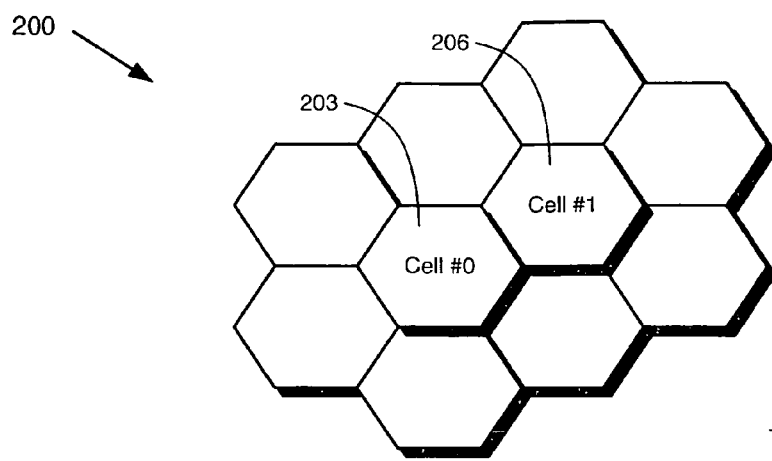
FIG. 2A illustrates an example diagram of geographical layout of cells for a spread spectrum communication system.
Figure 2B:
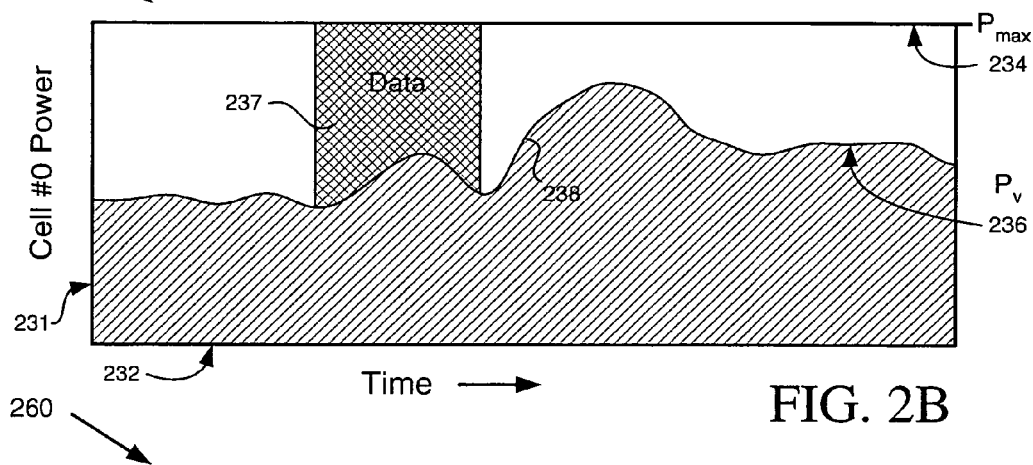
FIG. 2B illustrates an example of power control graphed as a function of time for cell number 0 of FIG. 2A.
Figure 2C:
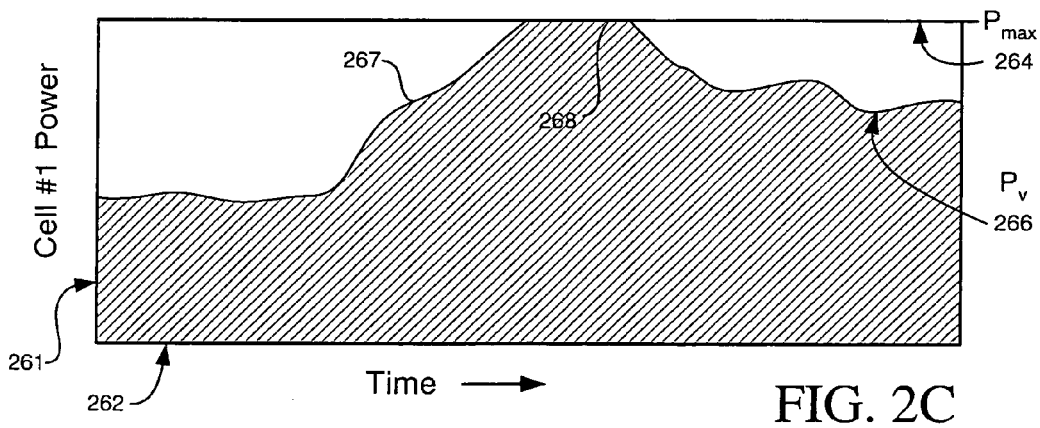
FIG. 2C illustrates an example of power control graphed as a function of time, over the same time period as FIG. 2B, for cell number 1 of FIG. 2A.

As shown in FIG. 3, filling Pv, max 306 with voice noise 308; increasing total power Pv+d 316 by pre-determined amounts; and filling in Pv+d 316 by inserting data noise such as data noise 320 between consecutive data bursts 310 and 312 have the effect of eliminating large swings, overshoots, and instability in the allocation of aggregate voice power Pv 304. For example, filling in Pv+d 316 by inserting data noise such as data noise 320 between consecutive data bursts 310 and 312 prevents the overreactions of the power control system to large sudden changes in data power level, discussed in connection with FIG. 1, by eliminating such large sudden changes when there are gaps in the data transmission. As a result, aggregate voice power Pv 304 changes smoothly. Increasing total power Pv+d 316 by pre-determined amounts also results in eliminating large sudden changes when there are transitions from "quiet periods" to transmitting data bursts or when there are large increases in the rate or amount of data being transmitted by the communication system. Moreover, filling Pv, max 306 with voice noise 308 prevents the feedback effect between cells discussed in connection with FIG. 2 by keeping the voice power, "seen" by other cells as noise, at a constant level, i.e. Pv, max 306. Keeping the voice power at a constant level further prevents large swings in the voice power, such as those seen in FIG. 2C, and thus prevents reactions of neighboring cells to those swings. As a result, the intra-cell power control problems discussed above in connection with FIG. 1 are avoided, and the inter-cell power control problems discussed above in connection with FIG. 2 are also avoided.

Figure 4:
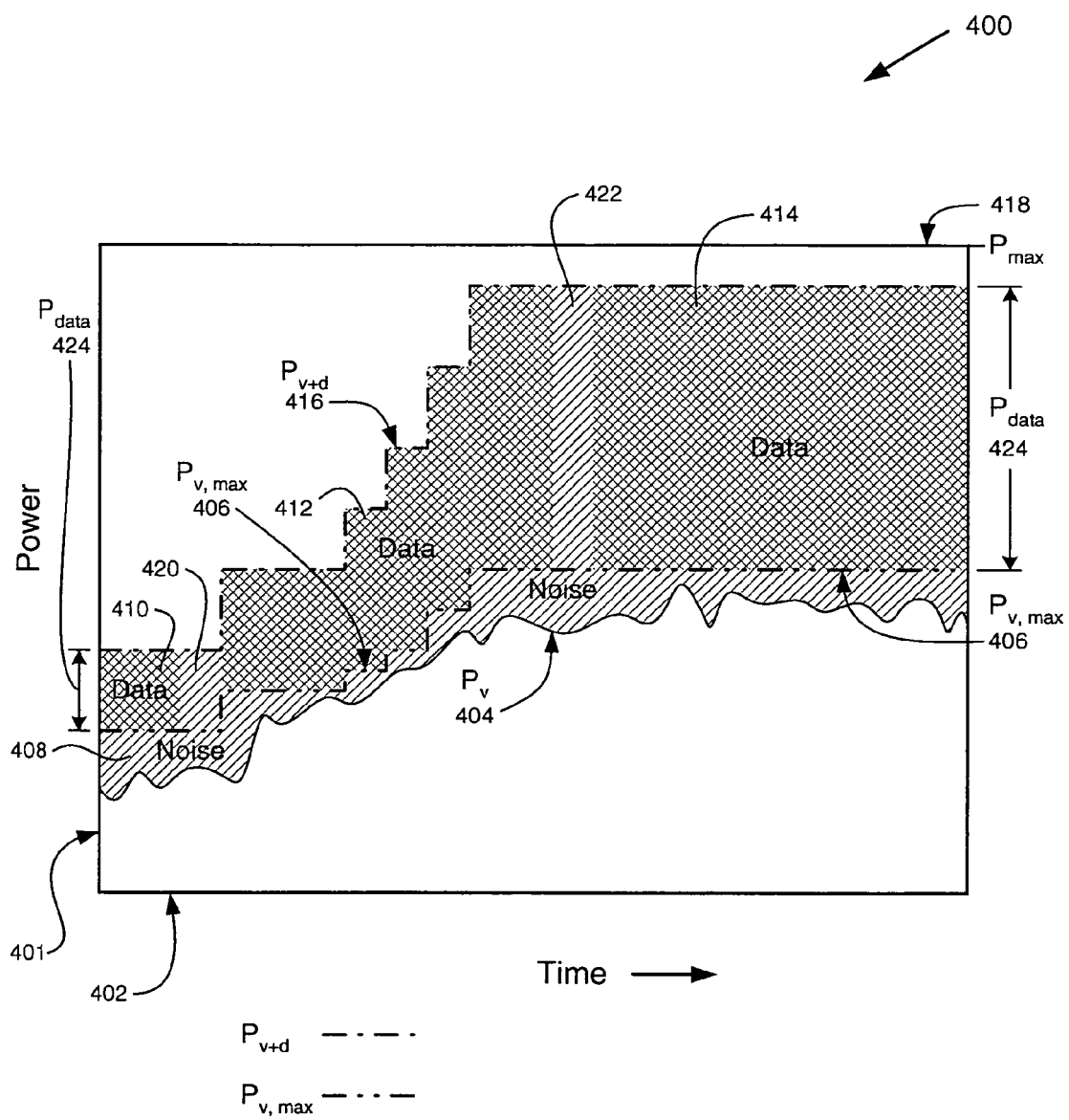
FIG. 4 also illustrates an example of power control graphed as a function of time in accordance with another embodiment for a spread spectrum communication system.

FIG. 4 illustrates another example of power control in a CDMA communication system in accordance with one embodiment. FIG. 4 shows graph 400, having power axis 401 plotted against time axis 402. Aggregate voice power Pv 404 for all voice users within the cell is shown in graph 400 as solid curve 404. Aggregate voice power Pv 404 varies in time as shown in graph 400. Voice power limit Pv,max 406 is the maximum voice power allocated for the aggregate of voice signal transmissions. Voice power limit Pv, max 406 is shown in graph 400 as double-dotted-dashed, stepped line 406. Extra voice power is allocated in addition to aggregate voice power Pv 404, so that the total voice power transmitted at any time is substantially equal to voice power limit Pv, max 406. The extra voice power is voice noise power 408, which "fills in" the gap between Pv 404 and Pv, max 406. As discussed above, voice noise power 408 is typically provided by transmitting artificial noise which is coded or spread the same way as other user signals so that the users within a cell can recover their own signal using spread spectrum despreading techniques despite added voice noise power 408.

When no useful information is transmitted using voice noise power 408, it is to the advantage of the system to minimize the amount of power consumed by voice noise power 408. FIG. 4 shows an example of adapting voice power limit Pv, max 406 in accordance with one embodiment. Adapting voice power limit Pv, max 406 has the effect of reducing the amount of power consumed by transmission of voice noise power 408, for example, in comparison with voice noise power 308 in the example shown in FIG. 3. Adaptation of voice power limit Pv, max 406 can be achieved in many ways. For example, voice power limit Pv, max 406 can be adjusted to pre-set levels in response to a change in usage in order to reflect periods of greater or lesser usage. Usage can be measured according to various criteria. For example, usage can be measured as the percentage utilization of the total system capacity based on the number of users actually using the system at a particular time compared to the maximum number of users the system can accommodate. As another example, usage can be measured as the percentage utilization of available transmit power by comparing the value of aggregate voice power Pv 404 to the value of maximum power limit Pmax 418, described below. The response to change in usage can be dynamic, or the response can be scheduled for certain times of day. Voice power limit Pv, max 406 can be set to a higher limit at the beginning of a "busy hour", for example, and then reset to a lower limit at the end of the busy hour.

Continuing with FIG. 4, power is allocated in addition to voice power limit Pv,max 406 for transmission of data bursts 410, 412, and 414. Total power Pv+d 416 is the total of aggregate voice power Pv 404 plus the power allocated for voice noise power 408 plus the power allocated for transmission of data bursts 410, 412, and 414. Thus, total power Pv+d 416 may also be stated as the total of Pv, max 406 plus the power allocated for data burst transmissions. Data power Pdata 424 is the power used for transmission of data bursts 410, 412, and 414. Thus, by definition:

$$Pv+d=P\text{data}+Pv, \text{max}.$$

Total power Pv+d 416 is shown in graph 400 as dotted-dashed, stepped line 416. Total power Pv+d 416 varies in time as shown in graph 400. The maximum available signal transmission power that can be allocated for the total of aggregate voice, artificial noise, and data transmissions is maximum total power limit Pmax 418, shown in graph 400 as horizontal solid line 418 and also indicated by "Pmax". As seen in graph 400, Pv+d 416 remains below maximum power limit Pmax 418.

As discussed above, transmission of data typically occurs in bursts. In order to prevent total power Pv+d 416 from suddenly dropping, additional data power is transmitted when there are gaps in the data transmission to maintain the power consumed by data transmission, data power Pdata 424, at a desired level. Accordingly, total power Pv+d 416 is maintained at a desired level. The additional data power, which "fills in" the gap between data burst 410 and data burst 412, and the gap between data burst 412 and data burst 414, is data noise 420 and data noise 422. As discussed above, data noise 420 and data noise 422 can be provided by transmitting artificial noise or dummy data, which is coded or spread the same way as other user data signals. Thus, the users within the cell can recover their own signal using spread spectrum despreading techniques despite added data noise 420 and data noise 422.

FIG. 4 also shows an example interaction of mixed voice and data signal transmission with power control in accordance with one embodiment. The amount of data power, Pdata 424, allocated to data burst 410 is controlled as a percentage of voice power limit Pv, max 406 rather than allocating the full amount of power which might be required to transmit data burst 410 as quickly as possible. For initial data burst 410, Pdata 424 is limited, for example, to 10% of Pv, max 406. Then, for example, for subsequent data burst 412, Pdata 424 is increased by pre-determined amounts of 5% of Pv,max 406 as required to transmit the data at a reasonable rate. For example, Pdata 424 can be increased subject to specific conditions relating the amount of data noise and actual data that have recently been transmitted. For example, the condition can be that the actual data transmitted, i.e. the amount of data transmitted in data burst 410, is 95% or more of the total power transmitted and that the data noise transmitted is 5% or less of the total power transmitted. In general, the pre-determined and pre-defined amounts for the adjustments can be any amounts between 0% and approximately 15%; 5% and 10% are used only as examples for illustrative purposes. For subsequent data burst 414, no further adjustments of Pdata 424 are required. As seen in the equation Pv+d=Pdata+Pv, max, total power Pv+d 416 is limited by the pre-determined increases in both Pdata 424 and Pv, max 406.

As shown in FIG. 4, adapting voice power limit Pv, max 406; filling Pv, max 406 with voice noise 408; increasing total power Pv+d 416 by pre-determined amounts; and filling in Pv+d 416 by inserting data noise such as data noise 420 between consecutive data bursts 410 and 412 have the effect of eliminating large swings, overshoots, and instability in the allocation of aggregate voice power Pv 404. For example, filling in Pv+d 416 by inserting data noise such as data noise 420 between consecutive data bursts 410 and 412 prevents the overreactions of the power control system to large sudden changes in data power level, discussed in connection with FIG. 1, by eliminating such large sudden changes when there are gaps in the data transmission. As a result, aggregate voice power Pv 404 changes smoothly. Increasing total power Pv+d 416 by pre-determined amounts also results in eliminating large sudden changes when there are transitions from "quiet periods" to transmitting data bursts or when there are large increases in the rate or amount of data being transmitted by the communication system. Moreover, filling Pv, max 406 with voice noise 408 prevents the feedback effect between cells discussed in connection with FIG. 2 by limiting the voice power, "seen" by other cells as noise, to slow, smooth, gradual changes, i.e. Pv, max 406 is constrained to pre-defined adjustments. Limiting the voice power to gradual changes further prevents large swings in the voice power, such as those seen in FIG. 2C, and thus prevents reactions of neighboring cells to those swings.

As a result, the intra-cell power control problems discussed above in connection with FIG. 1 are avoided, and the inter-cell power control problems discussed above in connection with FIG. 2 are also avoided. Furthermore, adaptation of voice power limit Pv, max 406 improves the efficiency and the economy of power control in the communication system by minimizing the amount of extra power used for voice noise filling.

Figure 5:
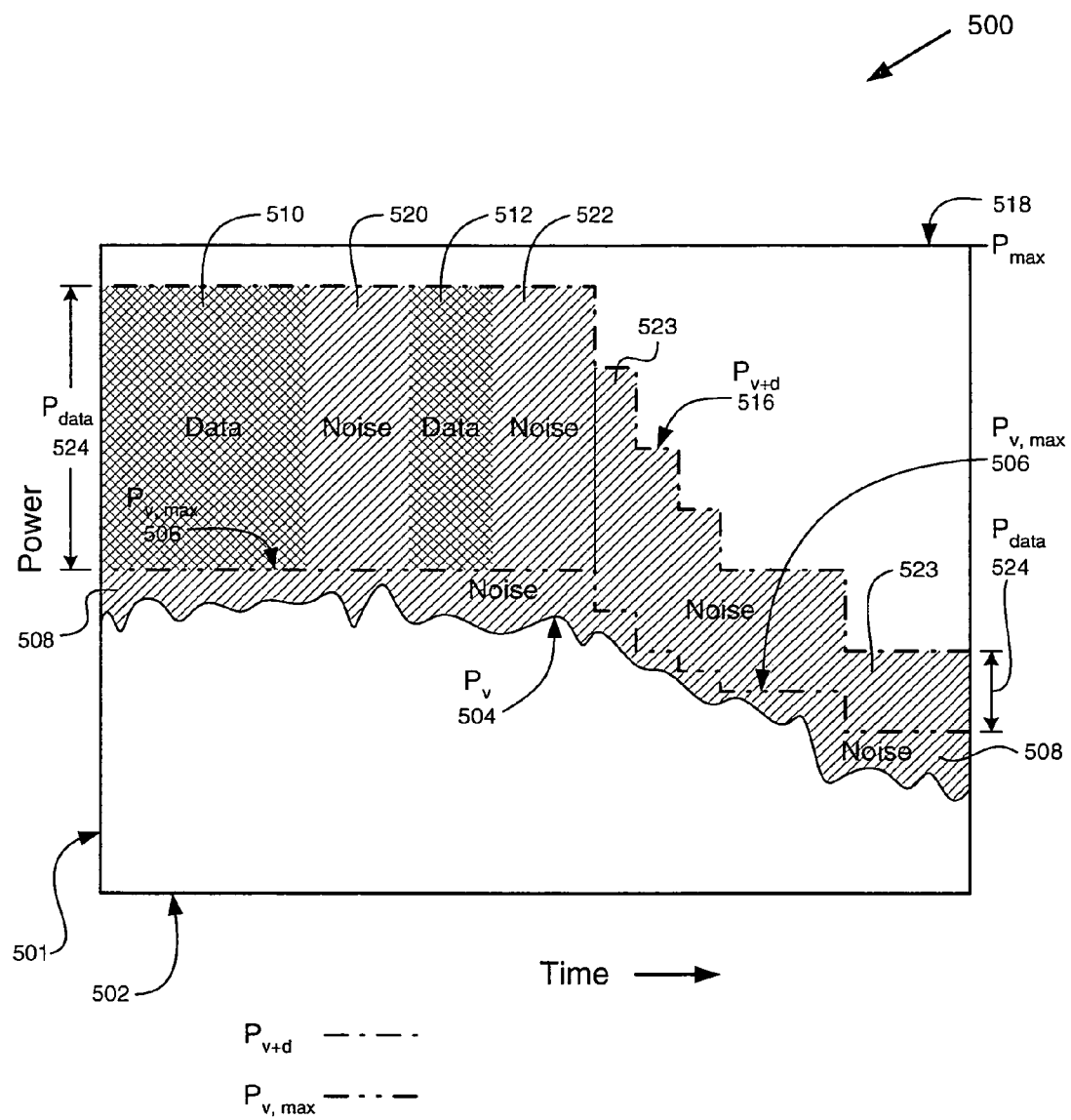
FIG. 5 illustrates an example of power control graphed as a function of time in accordance with yet another embodiment for a spread spectrum communication system.

FIG. 5 illustrates a further example of power control in a CDMA communication system in accordance with one embodiment. FIG. 5 shows graph 500, having power axis 501 plotted against time axis 502. Aggregate voice power Pv 504 for all voice users within the cell is shown in graph 500 as solid curve 504. Aggregate voice power Pv 504 varies in time as shown in graph 500. Voice power limit Pv,max 506 is the maximum voice power allocated for the aggregate of voice signal transmissions. Voice power limit Pv, max 506 is shown in graph 500 as double-dotted-dashed, stepped line 506. Extra voice power is allocated in addition to aggregate voice power Pv 504, so that the total voice power transmitted at any time is substantially equal to voice power limit Pv, max 506. The extra voice power is voice noise power 508, which "fills in" the gap between Pv 504 and Pv, max 506. As discussed above, voice noise power 508 is typically provided by transmitting artificial noise, which is coded or spread the same way as other user signals. Thus, the users within a cell can recover their own signal using spread spectrum despreading techniques despite added voice noise power 508.

When no useful information is transmitted using voice noise power 508, it is to the advantage of the system to minimize the amount of power consumed by voice noise power 508. FIG. 5 shows an example of adapting voice power limit Pv, max 506 in accordance with one embodiment. Adapting voice power limit Pv, max 506 has the effect of reducing the amount of power consumed by transmission of voice noise power 508 in comparison with the case in which a voice power limit, such as voice power limit Pv, max 306 shown in FIG. 3, is not adapted. Adaptation of voice power limit Pv, max 506 can be achieved in many ways. For example, voice power limit Pv, max 506 can be adjusted to pre-set levels in response to a change in usage or at certain times of the day in order to reflect periods of greater or lesser usage. Voice power limit Pv, max 506 can be set to a higher limit at the beginning of a "busy hour", for example, and then reset to a lower limit at the end of the busy hour.

Continuing with FIG. 5, power is allocated in addition to voice power limit Pv,max 506 for transmission of data bursts 510, 512, and 514. Total power Pv+d 516 is the total of aggregate voice power Pv 504 plus the power allocated for voice noise power 508 plus the power allocated for transmission of data bursts 510, 512, and 514. Thus, total power Pv+d 516 may also be stated as the total of Pv, max 506 plus the power allocated for data burst transmissions. Data power Pdata 524 is the power used for transmission of data bursts 510, 512, and 514. Thus, by definition:

$$Pv+d=Pdata+Pv, max.$$

Total power Pv+d 516 is shown in graph 500 as dotted-dashed, stepped line 516. Total power Pv+d 516 varies in time as shown in graph 500. The maximum available signal transmission power that can be allocated for the total of aggregate voice, artificial noise, and data transmissions is maximum total power limit Pmax 518, shown in graph 500 as horizontal solid line 518 and also indicated by "Pmax". As seen in graph 500, Pv+d 516 remains below maximum power limit Pmax 518.

As discussed above, transmission of data typically occurs in bursts. In order to prevent total power Pv+d 516 from suddenly dropping, additional data power is transmitted when there are gaps in the data transmission to maintain the power consumed by data transmission, data power Pdata 524, at a desired level. Accordingly, total power Pv+d 516 is maintained at a desired level. The additional data power, which "fills in" the gap between data burst 510 and data burst 512, is data noise 520. Similarly, data noise 522 is transmitted to maintain the level of total power Pv+d 516 after the end of data burst 512, although there is no data burst transmitted subsequent to the transmission of data noise 522. It is wasteful, however, to continue transmission of data noise 522 for very long if there is no subsequent data to transmit or if the data transmission rate has fallen low enough that substantially less power should be allocated to data transmission. In other words, data power Pdata 524 should be reduced or adjusted to a lower level.

Therefore, data noise 522 is transmitted subject to specific conditions relating the amount of data noise and actual data that have recently been transmitted. For example, the condition can be that the data noise transmitted is equal to or greater than the actual data transmitted. Then, if the amount of data noise 522 is equal to or greater than the amount of data transmitted in data burst 512, then data power Pdata 524 will be reduced or decreased by a pre-determined amount to a lower level. For example, the pre-determined amount can be equal to 10% of voice power limit Pv, max 506. FIG. 5 shows data noise 523 transmitted at a level of data power Pdata 524, which is reduce by 10% of voice power limit Pv, max 506 from the level of data noise 522. In general, the pre-determined and pre-defined amounts for the adjustments can be any amounts between 0% and approximately 15%, and 5% and 10% are used as examples only for illustrative purposes.

As no further data is transmitted, data power Pdata 524 continues to be reduced, for example, by a pre-determined amount equal to 10% of voice power limit Pv, max 506 for each reduction, during the transmission of data noise 523. Thus, the example in FIG. 5 shows a "stepped" appearance for data noise 523. In addition, the example of FIG. 5 shows voice power limit Pv, max 506 being reduced by amounts equal to approximately 10% of voice power limit Pv, max 506 during the transmission of data noise 523. Thus, total power Pv+d 516, which is the sum of data power Pdata 524 and voice power limit Pv, max 506, is shown in graph 500 as decreasing during the transmission of data noise 523 in response to both the reductions in voice power and in data power. As seen in the equation Pv+d=Pdata+Pv, max, total power Pv+d 516 is limited by the pre-determined decreases in both Pdata 524 and Pv, max 506.

Data noise 520, data noise 522, and data noise 523 can be provided by transmitting artificial noise or dummy data, which is coded or spread the same way as other user data signals, as discussed above. Thus, the users within the cell can recover their own signals using spread spectrum despreading techniques despite added data noise 520, data noise 522, and data noise 523.

As shown in FIG. 5, adapting voice power limit Pv, max 506; filling Pv, max 506 with voice noise 508; reducing data power Pdata 524 in pre-determined amounts; and filling in Pv+d 516 by inserting data noise such as data noise 520 between consecutive data bursts 510 and 512 or by inserting data noise such as data noise 523 when reducing data power Pdata 524 have the effect of eliminating large swings, overshoots, and instability in the allocation of aggregate voice power Pv 504. For example, filling in Pv+d 516 by inserting data noise such as data noise 520 between consecutive data bursts 510 and 512 prevents the overreactions of the power control system to large sudden changes in data power level, discussed in connection with FIG. 1, by eliminating such large sudden changes when there are gaps in the data transmission. As a result, aggregate voice power Pv 504 changes smoothly. Reducing total power Pv+d 516 by pre-determined amounts also results in eliminating large sudden changes when there are transitions from transmitting data bursts to "quiet periods" or when there are large decreases in the rate or amount of data being transmitted by the communication system. Moreover, filling Pv, max 506 with voice noise 508 prevents the feedback effect between cells discussed in connection with FIG. 2 by limiting the voice power, "seen" by other cells as noise, to slow, smooth, gradual changes, i.e. Pv, max 506 is constrained to pre-defined adjustments. Limiting the voice power to gradual changes further prevents large swings in the voice power, such as those seen in FIG. 2C, and thus prevents reactions of neighboring cells to those swings.

As a result, the intra-cell power control problems discussed above in connection with FIG. 1 are avoided, and the inter-cell power control problems discussed above in connection with FIG. 2 are also avoided. Furthermore, adaptation of voice power limit Pv, max 506 improves the efficiency and the economy of power control in the communication system by minimizing the amount of extra power used for voice noise filling. In addition, limiting and reducing data power Pdata 524, improves the efficiency and the economy of power control in the communication system by minimizing the amount of extra power used for data noise filling.

It is appreciated by the above detailed disclosure that the invention provides a method and system of power control for mixed voice and data transmissions in a CDMA communication system. Although the invention is described as applied to communications in a CDMA system, it will be readily apparent to a person of ordinary skill in the art how to apply the invention in similar situations where power control for mixed voice and data signal transmission is needed.

From the above description, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, the voice noise filling presented in one embodiment described here can be omitted so that data power is allocated directly on top of voice power without departing from the method of data noise filling and smoothly allocating data power presented in one embodiment described here. Also, for example, different techniques can be employed for measuring interference, transmitting artificial voice noise and artificial data noise, and adjusting the power allocated to the transmitted signal. Further, the type of information used for voice noise and data noise filling and the type of coding or spreading used may differ from that presented in one embodiment described here. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, a method for power control for mixed voice and data transmission has been described.

What is claimed is:

1. An apparatus comprising:
   means for adding a voice noise power to an aggregate voice power such that a total of said voice noise power and said aggregate voice power is substantially equal to a voice power limit;
   means for inserting a pre-determined amount of data noise after transmission of a data burst so as to maintain power consumed by data transmission at a desired level, wherein the voice noise power and the pre-determined amount of data noise are selected to limit power swings in a mixed voice and data channel below a desired threshold.

2. The apparatus of claim 1 further comprising means for increasing said desired level by a pre-determined amount during said data transmission.

3. The apparatus of claim 1 further comprising means for decreasing said desired level by a pre-determined amount during said data transmission.

4. The apparatus of claim 1 further comprising means for increasing said voice power limit by a pre-defined amount during said data transmission.

5. The apparatus of claim 1 further comprising means for decreasing said voice power limit by a pre-defined amount during said data transmission.

6. The apparatus of claim 2 wherein said pre-determined amount is between approximately 0% and approximately 15% of said voice power limit.

7. The apparatus of claim 3 wherein said pre-determined amount is between approximately 0% and approximately 15% of said voice power limit.

8. The apparatus of claim 4 wherein said pre-defined amount is between approximately 0% and approximately 15% of said voice power limit.

9. The apparatus of claim 5 wherein said pre-defined amount is between approximately 0% and approximately 15% of said voice power limit.

10. The apparatus of claim 1 wherein said adding said voice noise power comprises transmitting an orthogonally coded voice noise.

11. The apparatus of claim 1 wherein said inserting said pre-determined amount of said data noise comprises transmitting an orthogonally coded data noise.

12. The apparatus of claim 1 wherein said adding said voice noise power comprises transmitting a PN coded voice noise.

13. The apparatus of claim 1 wherein said inserting said pre-determined amount of said data noise comprises transmitting a PN coded data noise.

14. An apparatus comprising:
    means for adding a voice noise power to an aggregate voice power such that a total of said voice noise power and said aggregate voice power is substantially equal to a voice power limit;
    means for inserting a first amount of data noise after transmission of a data burst so as to maintain a total data transmission power at a fist level;
    means for inserting a second amount of data noise following said first amount of data noise so as to reduce a total data transmission power to a second level, wherein said second level is less than said first level by a pre-determined amount, wherein the voice noise power, the first amount of data noise, and the second amount of data noise are selected to limit power swings in a mixed voice and data channel below a desired threshold.

15. The apparatus of claim 14 wherein said pre-determined amount is between approximately 0% and approximately 15% of said voice power limit.

16. The apparatus of claim 14 further comprising means for decreasing said voice power limit by a pre-defined amount.

17. The apparatus of claim 16 wherein said pre-defined amount is between approximately 0% and approximately 15% of said voice power limit.

18. The apparatus of claim 14 wherein said adding said voice noise power comprises transmitting an orthogonally coded voice noise.

19. The apparatus of claim 14 wherein said inserting said pre-determined amount of said data noise comprises transmitting an orthogonally coded data noise.

20. The apparatus of claim 14 wherein said adding said voice noise power comprises transmitting a PN coded voice noise.

21. The apparatus of claim 14 wherein said inserting said pre-determined amount of said data noise comprises transmitting a PN coded data noise.

22. An apparatus comprising:
    means for adding a voice noise power to an aggregate voice power such that a total of said voice noise power and said aggregate voice power is substantially equal to a voice power limit;
    means for inserting a pre-determined amount of data noise after transmission of a data burst so as to maintain power consumed by data transmission at a desired level;
    means for adjusting said voice power limit by a pre-defined amount during said data transmission, wherein the voice noise power and the pre-determined amount of data noise are selected to limit power swings in a mixed voice and data channel below a desired threshold.

23. The apparatus of claim 22 wherein said adjusting comprises increasing said desired level by a pre-determined amount during said data transmission.

24. The apparatus of claim 22 wherein said adjusting comprises decreasing said desired level by a pre-determined amount during said data transmission.

25. The apparatus of claim 23 wherein said pre-determined amount is between approximately 0% and approximately 15% of said voice power limit.

26. The apparatus of claim 24 wherein said pre-determined amount is between approximately 0% and approximately 15% of said voice power limit.

27. The apparatus of claim 22 wherein said adding said voice noise power comprises transmitting an orthogonally coded voice noise.

28. The apparatus of claim 22 wherein said inserting said pre-determined amount of said data noise comprises transmitting an orthogonally coded data noise.

29. The apparatus of claim 22 wherein said adding said voice noise power comprises transmitting a PN coded voice noise.

30. The apparatus of claim 22 wherein said inserting said pre-determined amount of said data noise comprises transmitting a PN coded data noise.

31. An apparatus comprising:
    means for adding a voice noise power to an aggregate voice power such that a total of said voice noise power and said aggregate voice power is substantially equal to a voice power limit;
    means for inserting a first amount of data noise after transmission of a data burst so as to maintain a total data transmission power at a first level;
    means for adjusting said voice power limit by a first pre-determined amount during said data transmission;
    means for inserting a second amount of data noise following said first amount of data noise so as to reduce a total data transmission power to a second level, wherein said second level is less than said first level by a second pre-determined amount, wherein the voice noise power, the first amount of data noise, and second amount of data noise are selected to limit power swings in a mixed voice and data channel below a desired threshold.

32. The apparatus of claim 31 wherein said first pre-determined amount is between approximately 0% and approximately 15% of said voice power limit.

33. The apparatus of claim 31 wherein said second pre-determined amount is between approximately 0% and approximately 15% of said voice power limit.

34. The apparatus of claim 31 wherein said adding said voice noise power comprises transmitting an orthogonally coded voice noise.

35. The apparatus of claim 31 wherein said inserting said pre-determined amount of said data noise comprises transmitting an orthogonally coded data noise.

36. The apparatus of claim 31 wherein said adding said voice noise power comprises transmitting a PN coded voice noise.

37. The apparatus of claim 31 wherein said inserting said pre-determined amount of said data noise comprises transmitting a PN coded data noise.

38. An apparatus comprising:
   means for adjusting a voice power limit by a first pre-determined amount in response to a change in usage;
   means for adding a voice noise power to an aggregate voice power such that a total of said voice noise power and said aggregate voice power is substantially equal to said voice power limit;
   means for inserting a first amount of data noise after transmission of a data burst so as to maintain a total data transmission power at a first level;
   means for inserting a second amount of data noise following said first amount of data noise subject to a condition relating an amount of data transmitted in said data burst to said first amount of data noise so as to adjust said total data transmission power to a second level, wherein said second level differs from said first level by a second pre-determined amount, wherein the voice noise power, the first amount of data noise, and second amount of data noise are selected to limit power swings in a mixed voice and data channel below a desired threshold.

39. The apparatus of claim 38 wherein said adjusting said voice power limit comprises increasing said voice power limit by said first pre-determined amount when said usage increases.

40. The apparatus of claim 38 wherein said adjusting said voice power limit comprises decreasing said voice power limit by said first pre-determined amount when said usage decreases.

41. The apparatus of claim 38 wherein said condition relating an amount of data transmitted in said data burst to said first amount of data noise is that said amount of data transmitted in said data burst comprises at least 95% of said total data transmission power, and wherein said adjusting comprises increasing said total data transmission power by said second pre-determined amount to said second level.

42. The apparatus of claim 38 wherein said condition relating an amount of data transmitted in said data burst to said first amount of data noise is that said amount of data transmitted in said data burst comprises no more than 50% of said total data transmission power, and wherein said adjusting comprises decreasing said total data transmission power by said second pre-determined amount to said second level.

43. The apparatus of claim 38 wherein said first pre-determined amount is between approximately 0% and approximately 15% of said voice power limit.

44. The apparatus of claim 38 wherein said second pre-determined amount is between approximately 0% and approximately 15% of said voice power limit.

* * * * *